Nov. 5, 1935.                F. HEINL                2,019,567
           HOT WATER ACCUMULATOR PLANT FOR LOCOMOTIVES
               Filed Dec. 27, 1932     2 Sheets-Sheet 1
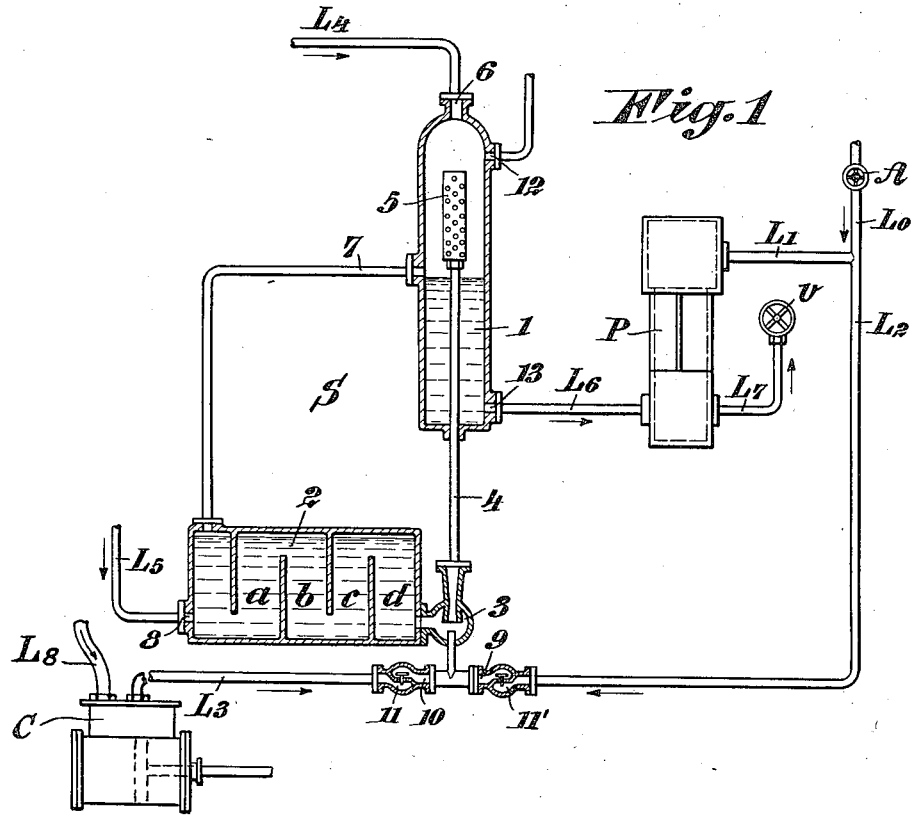
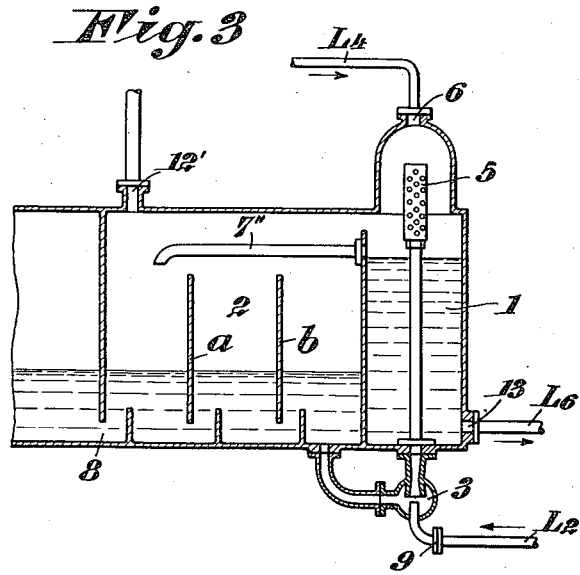
F. Heinl
INVENTOR
By Marks & Clerk
Attys.

Nov. 5, 1935.　　　　　F. HEINL　　　　　2,019,567
HOT WATER ACCUMULATOR PLANT FOR LOCOMOTIVES
Filed Dec. 27, 1932　　　2 Sheets-Sheet 2
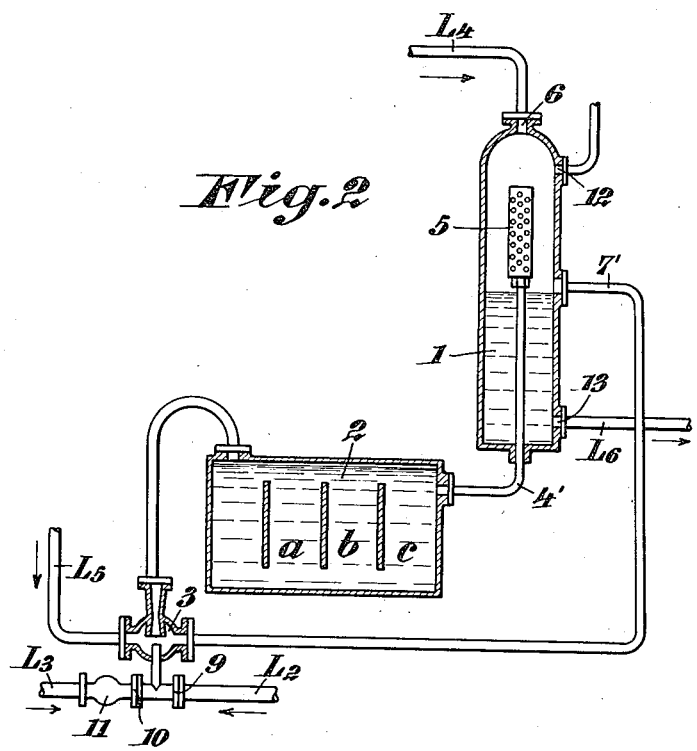

Patented Nov. 5, 1935

2,019,567

UNITED STATES PATENT OFFICE 2,019,567

HOT WATER ACCUMULATOR PLANT FOR LOCOMOTIVES

Franz Heinl, Vienna, Austria

Application December 27, 1932, Serial No. 649,103
In Germany December 28, 1931

3 Claims. (Cl. 122—442)

It has been proposed to preheat the feed water by exhaust steam in order to improve the efficiency of locomotives. Also heat accumulators have been arranged in order to feed warm water at the time when exhaust steam is not at disposal, thus when traveling with the regulator shut and at a standstill.

The known arrangements for the accumulation of feed water usually are of a most complicated construction and therefore are the cause of frequent breakdowns and their capacity either is small or they need a considerable time for the heating in case large accumulators are resorted to, so that they fulfill their task quite incompletely.

The present invention has for its object to facilitate the charge or discharge of accumulators of any size and, in the case of a large storage capacity, to render possible the discharge of hot feed water even in that moment in which the entire accumulator has not yet been heated. A further object of the invention is to render possible the discharge of hot water in such a way that at the same time the accumulator is filled with cold water, while hot water is discharged until the very last without mixing with the cold water and that finally the water level in front of the boiler feed arrangement always is sufficiently high in order to provide for a positive sucking up of the feed water.

The present invention includes a feed heater space in which the feed water is heated by the exhaust steam of the locomotive engine, from which the feed device takes the feed water and which is connected with an accumulator into which is fed back the excessive water of the feed heater. The invention consists in feeding the tender-water to be preheated at first into the accumulator and from here into the feed heater, an injector being provided for the circulation of the water through the accumulator and the feed heater. By a piping the live steam piping of the injector is connected by way of a shutting-off device (non-return valve) with the steam piping of the boiler feed device and by another shutting-off device with the steam chest of the locomotive engine.

The accumulator is divided into compartments which are in communication by passages which, according to the present invention, are comparatively small and always filled with water, in order that the cold water just admitted to the accumulator does not mix with the warm water of the latter.

Examples of carrying out the present invention are illustrated in part-sectional elevation in Figs. 1, 2 and 3 of the accompanying drawings.

In the construction shown in Fig. 1 S designates the accumulator, P the feed pump, sucking in the feed water by way of the pipe $L_6$ and forcing it into the boiler by way of the pressure pipe $L_7$ and the feed valve V. A designates a starting valve, which during the feed admits the boiler steam to the pipes $L_0$, $L_1$ and $L_2$. The pipe $L_3$ is connected with the steam chest C of the locomotive or with the steam supply pipe L of said steam chest, while the exhaust steam from the exhaust pipe of the locomotive passes through the pipe $L_4$ to the feed heater of the accumulator plant. The pipe $L_5$ serves for the supply of the cold water from the tender to the accumulator.

The accumulator plant S essentially consists of the feed heater 1, the accumulator 2, the injector 3, the pipings and the fittings therefor. The pipe 4 connects the injector 3 with the feed heater 1 and at its enlarged top end 5 is provided with openings for the fine distribution of the water, so that the exhaust steam of the locomotive, which enters the feed heater 1 by way of the port 6, is condensed. A pipe 7, secured at the height of the desired water level, connects the feed heater with the inlet end of the accumulator 2, the port 8 for the admission of cold tender-water being arranged at the same end.

The injector 3 is supplied with water from the outlet port of the accumulator and forces the same into the feed heater. The injector is provided with two steam connections 9 and 10. Boiler-steam is admitted by way of the inlet 9 and the non-return valve 11' to the injector, which is supplied with steam when starting the boiler feed pump P or another boiler feed device. This may be accomplished as shown in Fig. 1 or by two stop valves arranged in the pipes $L_1$ and $L_2$, which are connected with one another. Also these two valves may be made as single member with a two way starting member.

Thus live steam is admitted to the boiler feed pump P as well as to the injector 3 in such a manner, that a greater or smaller admission of live steam to the feed pump corresponds to a greater or smaller admission of live steam to the injector. Steam from the steam chest of the locomotive engine is admitted by way of a non-return valve to the injector, thus from the space between the locomotive regulator and the distribution member of the main engine, so that the injector is supplied with steam by way of the steam connection pipe 10 only in case the regulator is open.

The accumulator 2 is divided into chambers

*a, b, c, d* by means of partitions, so that the admitted water cannot mix with the discharging water. The accumulator and the injector are arranged so low down that the tender-water flows-in owing to gravity. A port 12 at the feed heater serves for the discharge of the excessive steam and of the vapors released when heating the water. The warm water leaves the feed heater by way of the port 13 and is forced into the boiler by the pump P.

During the feed operation, the injector is supplied with operating steam by way of the steam connection pipe 9. However if feeding does not take place and if the locomotive regulator is open, the injector is supplied with operating steam by way of the steam connection pipe 10. Thus the water circulates during the feed or if the locomotive regulator is open or if both take place simultaneously. In the latter case, the steam consumption is not any higher than if the regulator is shut, because the same is limited by the steam nozzle of the injector. The passage 10 is so small that such small quantities of steam are admitted from the steam chest as are necessary for the water circulation, whereby steam is saved. The non-return valve prevents the admission of steam or water into the steam chest. The injector is not supplied with operating steam and therefore does not provide for a circulation of water, if the regulator is shut and the feed is interrupted. In this case exhaust steam is not supplied to the feed heater, and a circulation is unnecessary because discharge from the feed heater does not take place.

Thus the injector 3 always operates when exhaust steam is supplied by the main engine, thus if the accumulator is charged or if water is fed, thus if the accumulator is discharged, in which event water must be supplied to the feed heater. Always hot water of a sufficient uniform pressure is at disposal for the supply to the feed pump, because the injector is of such size that, in view of the steam admitted by way of the pipe 9, a greater quantity of water is admitted than discharged by the feed pump, so that the water level in the feed heater always passes up to the overflow. The necessary quantity of steam is not of importance, because the circulating water from the injector is raised in the feed heater 1 solely for the difference between the water level of the tender and the overflow. The same is condensed by the feed water.

Fig. 2 shows an accumulator plant substantially of the same construction as described above but which is disposed at a higher level, which sometimes is necessary. This embodiment differs from the plant shown in Fig. 1 by a different successive arrangement, namely injector 3, accumulator 2 and feed heater 1, a pipe 7' establishing communication between the injector and the overflow of the feed heater.

Fig. 3 shows the arrangement of the accumulator plant on a tank-locomotive, the feed heater and accumulator being located in the water-tank. The successive arrangement is the same as in Fig. 1, namely injector 3, feed heater 1 and accumulator 2. Direct communication between the accumulator and the water-tank is established by a port 8 and therefore the contents of the accumulator is reduced in accordance with the sinking water level within the water-tank. A port 12' for the excessive steam and the released air is arranged on the accumulator, the top part of the latter communicating with the steam space of the feed heater, so that steam and air can pass from the feed heater to the accumulator and therefore the steam is supplied to the feed water even in the accumulator. The connection between the steam chest and the injector is not shown in this case, so that the accumulator-water does not circulate if the feed is interrupted even if the locomotive-regulator is open, because the exhaust steam has at its disposal a large area of attack within the feed heater and particularly within the accumulator.

What I claim is:—

1. A hot water accumulator plant for locomotives, comprising in combination a feed heater provided with an overflow port, means attached to said feed heater for the supply of exhaust steam, a feed device for the locomotive boiler, means connected with and establishing communication between the latter and said feed heater, an accumulator furnished with an inlet and an outlet, means connected with a second inlet of the accumulator and the overflow port of the feed heater for establishing communication between said accumulator and said feed heater, means for establishing communication between the outlet of the accumulator and said feed heater, means connected with the first said inlet of said accumulator for supplying water to the accumulator, an injector so associated with the said connections to the accumulator as to cause water to flow from the accumulator to the feed heater, means establishing communication between said injector and the steam supply of the feed device, a non-return valve in the means last mentioned and opening in the direction towards said injector, means connected to the forcing tube of the injector for the supply of live steam to the latter from the steam chest of the locomotive engine, and a second non-return valve fitted in the means last mentioned and opening in the direction towards said injector.

2. A hot water accumulator plant for locomotives, comprising in combination a feed heater provided with an overflow port, means attached to said feed heater for the supply of exhaust steam, a feed device for the locomotive boiler, means connected with and establishing communication between the latter and said feed heater, an accumulator furnished with an inlet and an outlet, partitions in said accumulator dividing it into a number of compartments, small sized communication passages between said compartment provided for the flow of water past said partitions, means connected with the accumulator and the overflow port of the feed heater for establishing communication between said accumulator and said feed heater, means for establishing communication between the outlet of the accumulator and said feed heater, means connected with the first said inlet of said accumulator for supplying water to the accumulator, an injector so associated with the said connections to the accumulator as to cause water to flow from the accumulator to the feed heater, means connected to the forcing tube of the injector for the supply of steam to the latter from the feed device, and a non-return valve in the means last mentioned and opening in the direction towards said injector.

3. A hot water accumulator plant for locomotives, comprising in combination a feed heater provided with an overflow port, means attached to said feed heater for the supply of exhaust steam, a feed device for the locomotive boiler, means connected with and establishing communication between the latter and said feed heater, an accumulator furnished with an inlet and an outlet, partitions in said accumulator dividing it into a number of compartments, small sized communication passages between said compartments provided for the flow of water past said partitions, means connected with the accumulator and the overflow port of the feed heater for establishing communication between said accumulator and said feed heater, means for establishing communication between the outlet of the accumulator and said feed heater, means connected with the first said inlet of said accumulator for supplying water to the accumulator, an injector so associated with the said connections to the accumulator as to cause water to flow from the accumulator to the feed heater, means establishing communication between said injector and the steam supply of the feed device, a non-return valve in the means last mentioned and opening in the direction towards said injector, means connected to the forcing tube of the injector for the supply of live steam to the latter from the steam chest of the locomotive engine, and a non-return valve fitted in the means last mentioned, and opening in the direction towards said injector.

FRANZ HEINL.